US011977885B2

(12) United States Patent
Maiyuran et al.

(10) Patent No.: US 11,977,885 B2
(45) Date of Patent: May 7, 2024

(54) UTILIZING STRUCTURED SPARSITY IN SYSTOLIC ARRAYS

(71) Applicant: Intel Corporation, Santa Clara, CA (US)

(72) Inventors: Subramaniam Maiyuran, Gold River, CA (US); Jorge Parra, El Dorado Hills, CA (US); Ashutosh Garg, Folsom, CA (US); Chandra Gurram, Folsom, CA (US); Chunhui Mei, San Diego, CA (US); Durgesh Borkar, Folsom, CA (US); Shubra Marwaha, Folsom, CA (US); Supratim Pal, Bangalore (IN); Varghese George, Folsom, CA (US); Wei Xiong, Fremont, CA (US); Yan Li, San Diego, CA (US); Yongsheng Liu, San Diego, CA (US); Dipankar Das, Pune (IN); Sasikanth Avancha, Kolar District (IN); Dharma Teja Vooturi, Jagtial (IN); Naveen K. Mellempudi, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 622 days.

(21) Appl. No.: 17/107,823

(22) Filed: Nov. 30, 2020

(65) Prior Publication Data

US 2021/0081201 A1 Mar. 18, 2021

(51) Int. Cl.

| | |
|---|---|
| ***G06F 9/30*** | (2018.01) |
| ***G06F 9/38*** | (2018.01) |
| ***G06F 15/80*** | (2006.01) |

(52) U.S. Cl.
CPC ........ *G06F 9/30036* (2013.01); *G06F 9/3001* (2013.01); *G06F 9/30101* (2013.01); *G06F 9/3893* (2013.01); *G06F 15/8046* (2013.01)

(58) Field of Classification Search
None
See application file for complete search history.

(56) References Cited

U.S. PATENT DOCUMENTS 5,862,067 A * 1/1999 Mennemeier ......... G06F 7/5443 712/42
11,113,784 B2 * 9/2021 Ray ........................... G06T 1/20
(Continued)

OTHER PUBLICATIONS

Hegde, K. et al., ExTensor: An Accelerator for Sparse Tensor Algebra, 2019, ACM, pp. 319-333. (Year: 2019).*

*Primary Examiner* — Eric Coleman
(74) *Attorney, Agent, or Firm* — JAFFERY WATSON MENDONSA & HAMILTON LLP

(57) ABSTRACT

An apparatus to facilitate utilizing structured sparsity in systolic arrays is disclosed. The apparatus includes a processor comprising a systolic array to receive data from a plurality of source registers, the data comprising unpacked source data, structured source data that is packed based on sparsity, and metadata corresponding to the structured source data; identify portions of the unpacked source data to multiply with the structured source data, the portions of the unpacked source data identified based on the metadata; and output, to a destination register, a result of multiplication of the portions of the unpacked source data and the structured source data.

20 Claims, 11 Drawing Sheets

Computing System 100
Operating System (OS) 110
Central Processing Unit (CPU) 115
Hardware Accelerator 114
Graphics Processing Unit (GPU) 112
Packed Source Data
Sparsity Metadata
Unpacked Source Data
Systolic Array 140
Control Logic Circuitry 142
Selection Circuitry 144
Data Processing Units (DPUs) 146
Output Data
Memory 130
Systolic Array Memory 135
Input/Output (I/O) Source(s) 160

(56) References Cited

U.S. PATENT DOCUMENTS

| | | | | |
|---|---|---|---|---|
| 2018/0046916 | A1* | 2/2018 | Dally | G06F 7/523 |
| 2019/0324746 | A1 | 10/2019 | Maiyuran et al. | |
| 2020/0151571 | A1* | 5/2020 | Wu | G06N 3/084 |
| 2020/0301995 | A1* | 9/2020 | Shibata | G06N 3/063 |
| 2022/0012598 | A1* | 1/2022 | Fok | G06F 9/3818 |

* cited by examiner

400

Packing the data: 402

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| 410 | Original data: | 0 | 0 | #A | #B | 0 | 0 | #C | #D | 0 | 0 | 0 | 0 | 0 | 0 | #E | #F | #G | #H | 0 | 0 | #I | #J | 0 | 0 | 0 | 0 | 0 | 0 | #K | #L | 0 | 0 |
| 420 | Metadata: | 0 | 0 | 1 | 1 | 0 | 0 | 1 | 1 | 0 | 0 | 0 | 0 | 0 | 0 | 1 | 1 | 1 | 1 | 0 | 0 | 1 | 1 | 0 | 0 | 0 | 0 | 0 | 0 | 1 | 1 | 0 | 0 |
| 430 | Packed data: | #A | #B | #C | #D | 0 | 0 | #E | #F | #G | #H | #I | #J | 0 | 0 | #K | #L | | | | | | | | | | | | | | | | |

Finding multiplicands in systolic array: 404

| | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| 430 | Packed data: | #A | #B | #C | #D | 0 | 0 | #E | #F | #G | #H | #I | #J | 0 | 0 | #K | #L | | | | | | | | | | | | | | | | |
| 440 | Pos Metadata | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 420 | Metadata: | 0 | 0 | 1 | 1 | 0 | 0 | 1 | 1 | 0 | 0 | 0 | 0 | 0 | 0 | 1 | 1 | 1 | 1 | 0 | 0 | 1 | 1 | 0 | 0 | 0 | 0 | 0 | 0 | 1 | 1 | 0 | 0 |

Packing the data:

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 510 Original data: | 0 | 0 | #A | #B | 0 | 0 | #C | #D | 0 | 0 | 0 | 0 | 0 | 0 | #E | #F | #G | #H | 0 | 0 | #I | #J | 0 | 0 | 0 | 0 | 0 | 0 | #K | #L | 0 | 0 |
| 520 Metadata: | 0 | 0 | 1 | 1 | 0 | 0 | 1 | 1 | 0 | 0 | 0 | 0 | 0 | 0 | 1 | 1 | 1 | 1 | 0 | 0 | 1 | 1 | 0 | 0 | 0 | 0 | 0 | 0 | 1 | 1 | 0 | 0 |

| | | | | | | | | | | | | | | | | |
|---|---|---|---|---|---|---|---|---|---|---|---|---|---|---|---|---|
| 530 Packed data: | #A | #B | #C | #D | 0 | 0 | #E | #F | #G | #H | #I | #J | 0 | 0 | #K | #L |

550

700

| 710 Clock | 720a Stage 0 | 720b Stage 1 | 720c Stage 2 | 720d Stage 3 | 720e Stage 4 | 720f Stage 5 | 720g Stage 6 | 720h Stage 7 | 730 output |
|---|---|---|---|---|---|---|---|---|---|
| | | | | | | | | | |
| 1 | r77[0..15] r12<br>r20[0..15] *+<br>r1{63,0} | | | | | | | | |
| 2 | | r12<br>r21[0..15] *+<br>r1{127,64} | | | | | | | |
| 3 | | | r12<br>r22[0..15] *+<br>r1{191,128} | | | | | | |
| 4 | | | | r12<br>r23[0..15] *+<br>r1{255,192} | | | | | |
| 5 | | | | | r12<br>r24[0..15] *+<br>r1{319,256} | | | | |
| 6 | | | | | | r12<br>r25[0..15] *+<br>r1{383,320} | | | |
| 7 | | | | | | | r12<br>r26[0..15] *+<br>r1{447,384} | | |
| 8 | | | | | | | | r12<br>r27[0..15] *+<br>r1{511,448} | |
| 9 | | | | | | | | | r77[0..15] |
| | | | | | | | | | |

KEY:

| | | | |
|---|---|---|---|
| 740 | src0 | src2 | 744 |
| 742 | src1 | *+ | 746 |
| | Metadata | | 748 |

750
sdpas 16x4 r77.0:f r77.0:f r20.0:f r12.0:hf r1.0, ...

Figure 8:
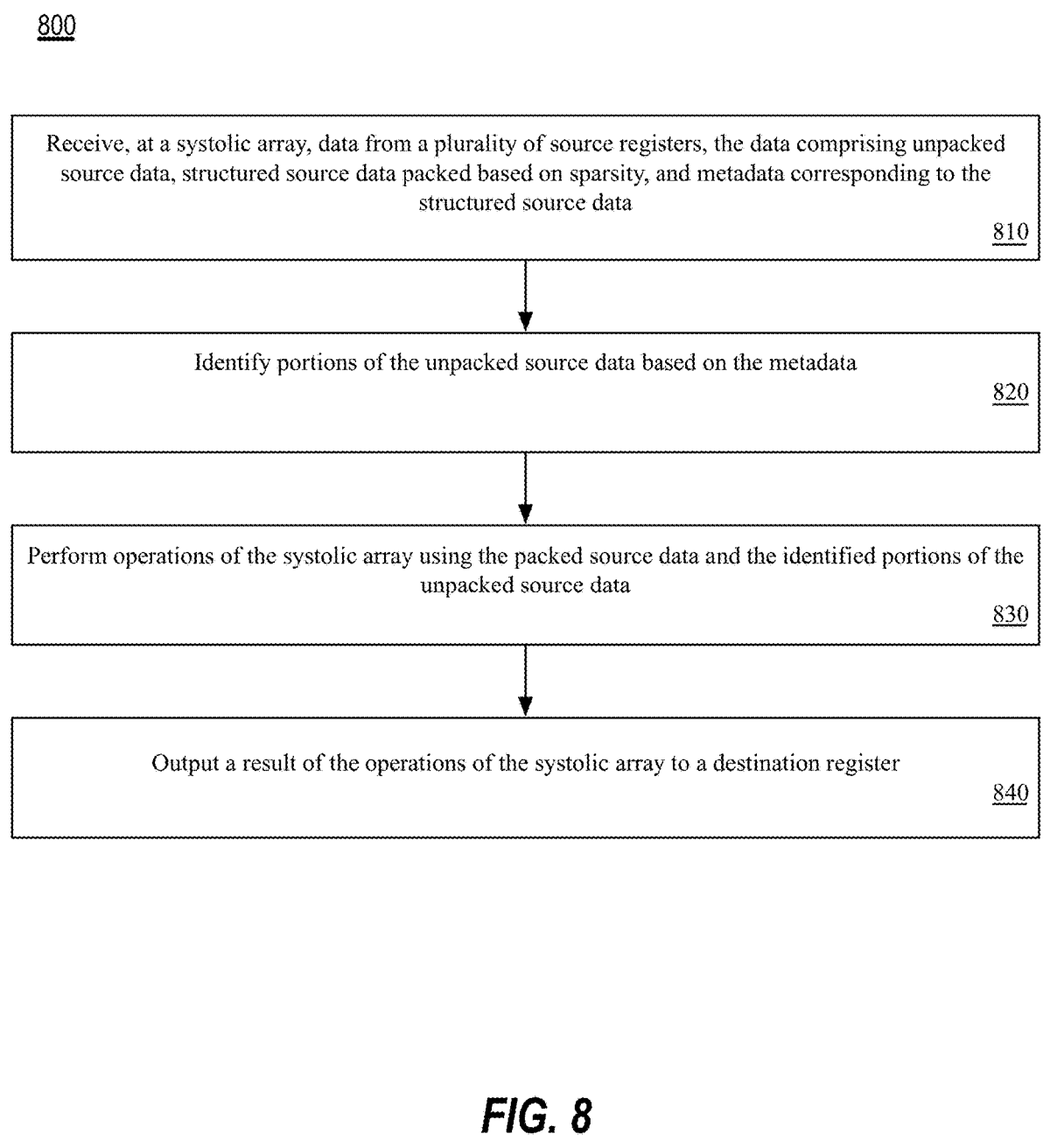

Receive, at a systolic array, data from a plurality of source registers, the data comprising unpacked source data, structured source data packed based on sparsity, and metadata corresponding to the structured source data
810

Identify portions of the unpacked source data based on the metadata
820

Perform operations of the systolic array using the packed source data and the identified portions of the unpacked source data
830

Output a result of the operations of the systolic array to a destination register
840

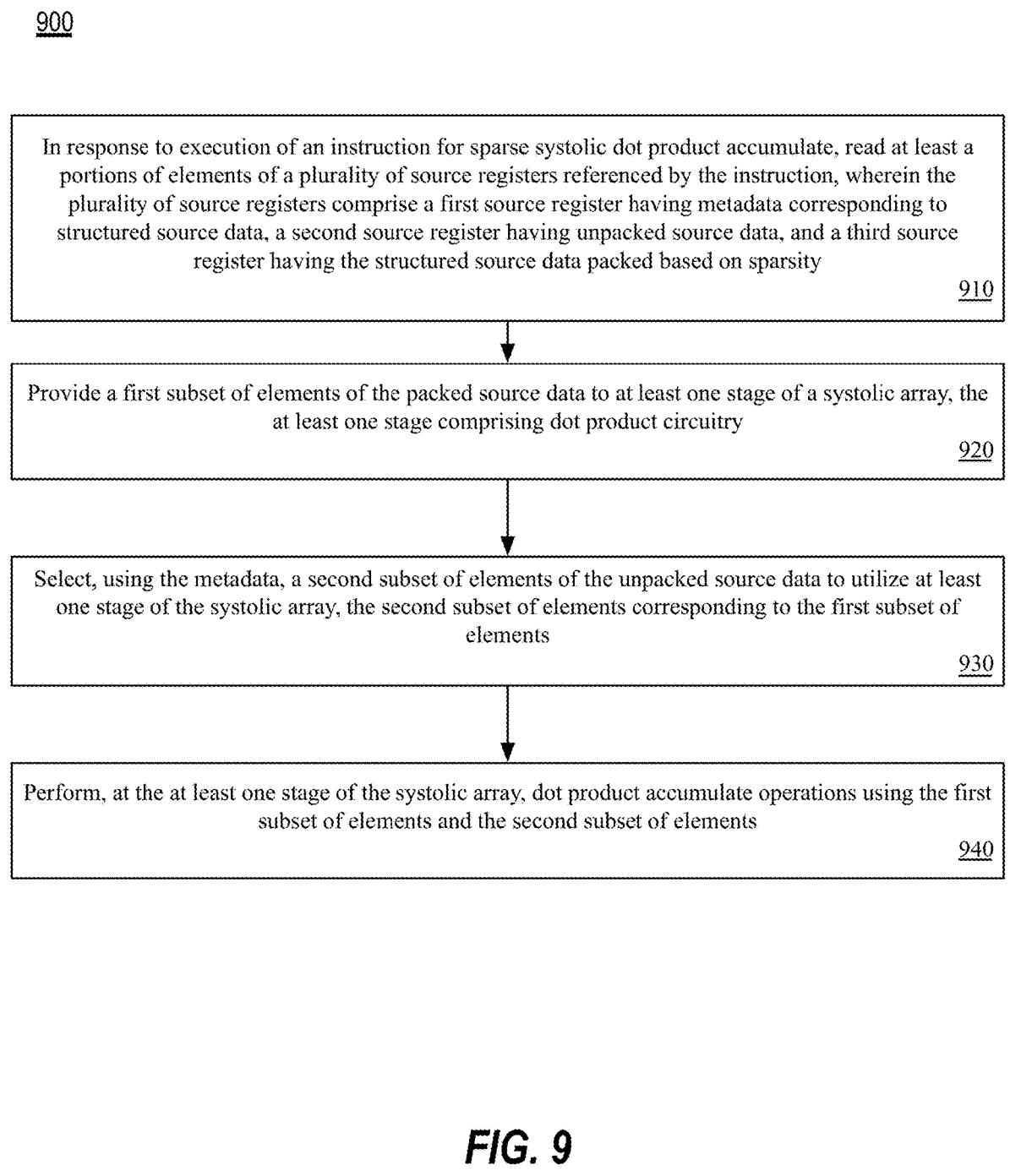

In response to execution of an instruction for sparse systolic dot product accumulate, read at least a portions of elements of a plurality of source registers referenced by the instruction, wherein the plurality of source registers comprise a first source register having metadata corresponding to structured source data, a second source register having unpacked source data, and a third source register having the structured source data packed based on sparsity
910

Provide a first subset of elements of the packed source data to at least one stage of a systolic array, the at least one stage comprising dot product circuitry
920

Select, using the metadata, a second subset of elements of the unpacked source data to utilize at least one stage of the systolic array, the second subset of elements corresponding to the first subset of elements
930

Perform, at the at least one stage of the systolic array, dot product accumulate operations using the first subset of elements and the second subset of elements
940

*FIG. 9*

UTILIZING STRUCTURED SPARSITY IN SYSTOLIC ARRAYS

FIELD

This disclosure relates generally to data processing and more particularly to utilizing structured sparsity in systolic arrays.

BACKGROUND OF THE DISCLOSURE

Neural networks and other types of machine learning models are useful tools that have demonstrated their value solving complex problems regarding pattern recognition, natural language processing, automatic speech recognition, etc. Neural networks operate using artificial neurons arranged into one or more layers that process data from an input layer to an output layer, applying weighting values to the data during the processing of the data. Such weighting values are determined during a training process and applied during an inference process.

Sparsity is a property of the data received by an execution unit. Sparsity can be capitalized upon to improve the performance of some arithmetic and logic operations. Sparsity refers to the amount of values being zeroes among the data used in a series of operations. It is recognized that multiplications when operated with zeros, give a zero as a result. If the result of these operations is known, the operations are not computed and execution time can be saved.

An instruction that computes dot matrices multiplication in a systolic array is often used in machine learning (ML) algorithms to execute neural networks. In these workloads, usually the weights and the activations of layers of the neurons are represented as matrices and multiplied. The weights have a high probability of having many sparse values when they are computed from a function (e.g., a RELU function) whose output is zero for any negative input.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers will be used throughout the drawing(s) and accompanying written description to refer to the same or like parts.

FIG. 4 illustrates an example data packing case using half float elements, in accordance with implementations of the disclosure.

FIG. 7 illustrates a schematic of operations of the systolic array when structured sparsity is provided in the index, according to implementations of the disclosure.

FIG. 8 is a flow diagram illustrating a method for utilizing structured sparsity in systolic arrays, in accordance with implementations of the disclosure.

FIG. 9 is a flow diagram illustrating a method for performing matrix multiplication in systolic arrays utilizing structured sparsity, in accordance with implementations of the disclosure.

DETAILED DESCRIPTION

Figure 1:
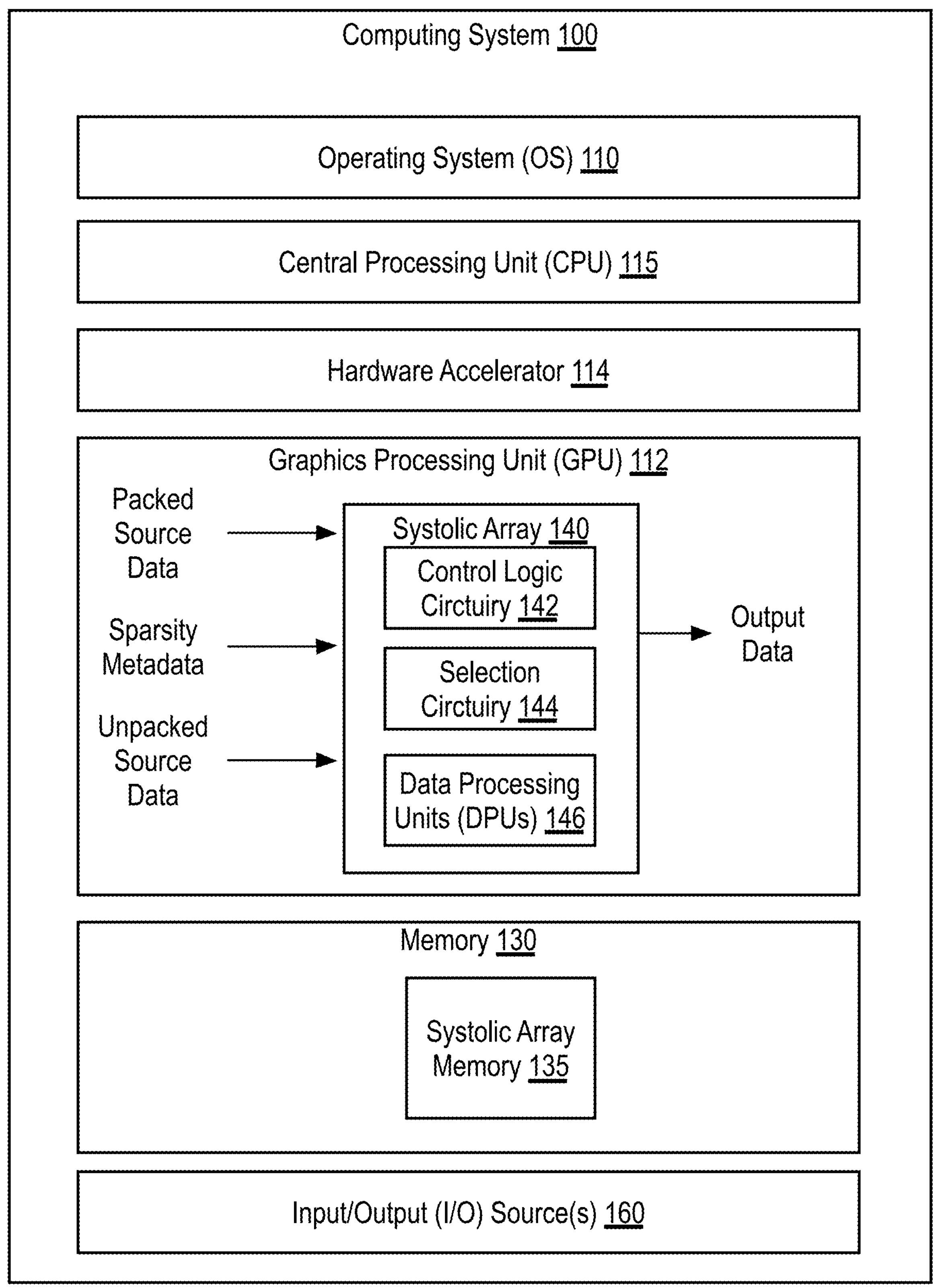
FIG. 1 is a block diagram of an example computing system that may be used to utilize structured sparsity in systolic arrays, according to implementations of the disclosure.

Implementations of the disclosure describe utilizing structured sparsity in systolic arrays. Today's computing systems are expected to deliver near zero-wait responsiveness and superb performance while taking on large workloads for execution. Therefore, computing architectures have continually changed (e.g., improved) to accommodate large (and often demanding) workloads and increased performance expectations.

Examples of large workloads include neural networks, artificial intelligence (AI), machine learning, etc. Such workloads have become more prevalent as they have been implemented in a number of computing devices, such as personal computing devices, business-related computing devices, etc. Furthermore, with the growing use of large machine learning and neural network workloads, new silicon has been produced that is targeted at running large workloads. Such new silicon includes dedicated hardware accelerators (e.g., graphics processing unit (GPU), field-programmable gate array (FPGA), vision processing unit (VPU), etc.) customized for processing data using data parallelism.

Many different types of machine learning models and/or machine learning architectures exist. One particular type of machine learning model is a neural network. A deep neural network (DNN) is one type of neural network architecture. When training a machine learning model, such as a neural network or DNN, input data is transformed to some output, and a loss or error function is used to compare if the model predicts an output value close to an expected value. The amount of calculated error is then propagated back from the output to the inputs of the model using stochastic gradient descent (or another training algorithm) and the process repeats until the error is acceptably low enough or a maximum number of iterations is achieved. The parameters learned during this training process are the weights that connect each node. In some examples, hundreds, thousands, tens of thousands, etc., of nodes may be involved in the DNN.

Some accelerators (e.g., the VPU) include computation engines to execute neural network workloads. A neural compute engine (NCE), is hardware that is configured to run neural network workloads at high speeds and low power without compromising accuracy. In examples disclosed herein, neural network workloads are topologies represented as compute graphs that include nodes and edges. As used herein, nodes are primitive mathematical operations also referred to as layers, and edges are paths that inter-connect nodes and are represented as multidimensional arrays (e.g., tensors). In some examples, an NCE executes a topology on a per-layer basis such that the NCE executes each layer by performing the mathematical operations represented by the nodes and dataflow operations represented by the edges of that layer. An NCE executes a layer in four steps that run substantially in parallel: 1) reading an input activation tensor, 2) reading a parameter tensor. 3) executing a layer operation (e.g., performing convolution, fully connected, etc.), and 4) writing an output activation tensor. In some examples, the reading and writing steps are referred to herein as memory cycles and the executing steps are referred to herein as computation cycles.

Therefore, the NCE performs computation cycles and memory cycles during the execution of a layer. As used herein, performance is the speed at which the NCE executes the layer in a neural network workload. For example, the performance of the NCE is measured based on how the computing architecture of the NCE leverages the computing cycles versus the memory cycles. Current challenges in deploying the large workloads of neural networks and machine learning models, for example, include reducing data movement and increasing compute density while executing these workloads.

One conventional technique to reduce data movement and increase compute density includes sparsity support. With respect to sparsity support, this approach can reduce and/or eliminate moving and computing on values that are zero, especially with pruning of low energy weights to increase the occurrences of such values. Sparsity is a property of the data received by an execution unit. Sparsity, as discussed herein, may refer to the presence of mostly zeros in a vector or matrix. Architects can capitalize on sparsity to improve the performance of some arithmetic and logic operations. Sparsity refers to the amount of values being zeroes among all the data used in a series of operations. It is recognized that multiplications, when operated with zero, give a zero as result. If the result of these operations is known, the operations are not computed and therefore, their execution time can be saved.

An instruction that computes dot matrices multiplication in a systolic array is often used in machine learning (ML) algorithms to execute neural networks. One example of such an instruction is a Dot Product Accumulate Systolic (DPAS) instruction that computes dot matrices multiplication in a systolic array. A systolic array as discussed herein refers to a homogenous network of tightly-coupled data processing units (DPUs) called cells or nodes, where each node independently computes a partial result as a function of the data received from its upstream neighbors, stores the result within itself, and passes it downstream. Systolic arrays are used for massive multiply-accumulate operations, such as performed by neural networks implemented by hardware accelerators and/or graphics processors.

As noted above, instructions for systolic dot product with accumulate (such as the DPAS instruction) are commonly used in Machine Learning (ML) algorithms to execute neural networks. In these neural network workloads, usually the weights and the activations of layers of neurons are represented as matrices and multiplied. The weights have a high probability of having many sparse values when they are computed from a function (i.e. a RELU function) whose output is 0 for any negative input. Profiling of some common neural network workloads (e.g., Resnet, FFN1, and FFN2 Bert encoders) have shown sparsity levels of around 50%.

Implementations of the disclosure propose a technique to allow operations of the dot product multiplication of two matrices that take advantage of the sparsity in the incoming data to enhance the performance of the operations. Implementations of the disclosure introduce a new instruction (referred to herein as a sparse systolic dot product with accumulate instruction, an instruction for sparse systolic dot product with accumulate, or an SDPAS instruction) intended to recognize the sparsity that is pre-calculated in a received set of data, and a new methodology that improves the performance of the matrix multiplication in cases of structured-data matrices (e.g., as used in inference algorithms).

Previous approaches to utilizing the sparsity present in matrices data on computations executed by systolic arrays can be classified into two groups: (1) solutions that iteratively use a systolic array or a group of systolic arrays to compute non-sparse elements; and (2) solutions that merge the non-sparse data from two operations and independently compute them in a single pass of a systolic array.

The first group (1) consists of a systolic array or a group of systolic arrays that feature a feedback between its output and its inputs. A vector of data that is to be computed is stripped from its non-sparse elements and broken into smaller pieces of the length of the systolic array's depth. These pieces are fed to the systolic array and the result can be accumulated and added on each iteration. The advantage of these conventional systems is that just a small amount of hardware is added on top of a systolic array that does not take advantage of the sparsity in the data. The disadvantage of this solution is that the depth of the pipeline limits the minimum length of the pieces to be fed to the pipeline. Therefore, there are cases where some of these pieces should be padded with zeros thus impacting the maximum performance achieved with this solution.

The second group (2) consists of loading two or more operands in a vector form. The two or more operands replace the sparse values of one operand with non-sparse values from other operands to create a new vector that can be executed in the systolic array. The systolic array should be capable to process and carry several independent streams of operations, so it should be capable to dynamically change the interconnections of its stages (also referred to as systolic layers) in a pipelined manner. This solution can lead to good efficiencies, but is costly in hardware resources and in design/validation effort.

The conventional solutions discussed above are useful for computing matrices that arrive in an unstructured sparsity format. In such cases, the matrices data arrives in a raw form and is the hardware's responsibility to do the matrices computation by taking advantage of the sparsity using any of the conventional solutions previously described. However, in a structured sparsity case, the data is preprocessed by an external agent (e.g., a central processing unit (CPU) or an intelligent sensor), its sparse information is removed, and the data arrives compacted to the execution engine. As the data does not contain sparse information, the previous solutions cannot be applied. Moreover, the amount of hardware the previous solutions use is not adequate for this structured sparsity case.

Implementations of the disclosure propose utilizing structured sparsity in systolic arrays. In implementations of the disclosure a set of rules is provided that an external agent should follow to prepare the matrices data to work with the proposed structured sparsity computing engine. The interface between the results output by the external agent and the inputs used by the computing engine are defined. The process of decoding the input data is also proposed in implementations of the disclosure.

Implementations of the disclosure also provide a hardware structure to utilize the structured sparsity in systolic arrays via an array of selection circuits (e.g., multiplexors (muxes)) in the systolic array. The array of selection circuits can drive elements from one source to their corresponding elements to be operated within a second source. This array of selection circuits can be present for each stage (or systolic layer) in the systolic array pipeline.

A technical advantage of implementations of the disclosure includes providing a low-cost way to take advantage of the sparsity present in the matrices data when computed by existing systolic arrays. In some cases, up to half of the elements in the matrices' data can be sparse (i.e., has a value of 0). As such, avoiding transferring this data from memory to the computing engine, doing computations on this data, and carrying the results of already known results in these cases, reduces the hardware and the power used to optimize the performance of the matrix multiplication. As this operation is in the core of most machine learning workloads, improving its performance can improve the overall performance and the power consumption of machine learning workloads.

FIG. 1 is a block diagram of an example computing system that may be used to utilize structured sparsity in systolic arrays, according to implementations of the disclosure. The example computing system 100 may be implemented as a component of another system such as, for example, a mobile device, a wearable device, a laptop computer, a tablet, a desktop computer, a server, etc. In one embodiment, computing system 100 includes or can be integrated within (without limitation): a server-based gaming platform; a game console, including a game and media console; a mobile gaming console, a handheld game console, or an online game console. In some embodiments the computing system 100 is part of a mobile phone, smart phone, tablet computing device or mobile Internet-connected device such as a laptop with low internal storage capacity. In some embodiments the computing system 100 is part of an Internet-of-Things (IoT) device, which are typically resource-constrained devices. IoT devices may include embedded systems, wireless sensor networks, control systems, automation (including home and building automation), and other devices and appliances (such as lighting fixtures, thermostats, home security systems and cameras, and other home appliances) that support one or more common ecosystems, and can be controlled via devices associated with that ecosystem, such as smartphones and smart speakers.

Computing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the computing system 100 includes or is part of a television or set top box device. In one embodiment, computing system 100 can include, couple with, or be integrated within a self-driving vehicle such as a bus, tractor trailer, car, motor or electric power cycle, plane or glider (or any combination thereof). The self-driving vehicle may use computing system 100 to process the environment sensed around the vehicle.

As illustrated, in one embodiment, computing device 100 may include any number and type of hardware and/or software components, such as (without limitation) graphics processing unit ("GPU", general purpose GPU (GPGPU), or simply "graphics processor") 112, a hardware accelerator 114, central processing unit ("CPU" or simply "application processor") 115, memory 130, network devices, drivers, or the like, as well as input/output (I/O) sources 160, such as touchscreens, touch panels, touch pads, virtual or regular keyboards, virtual or regular mice, ports, connectors, etc. Computing device 100 may include operating system (OS) 110 serving as an interface between hardware and/or physical resources of the computer device 100 and a user. In some implementations, the computing system 100 may include a combination of one or more of the CPU 115, GPU 112, and/or hardware accelerator 114 on a single system on a chip (SoC), or may be without a GPU 112 or visual output (e.g., hardware accelerator 114) in some cases, etc.

As used herein, "hardware accelerator", such as hardware accelerator 114, refers to a hardware device structured to provide for efficient processing. In particular, a hardware accelerator may be utilized to provide for offloading of some processing tasks from a central processing unit (CPU) or other general processor, wherein the hardware accelerator may be intended to provide more efficient processing of the processing tasks than software run on the CPU or other processor. A hardware accelerator may include, but is not limited to, a graphics processing unit (GPU), a vision processing unit (VPU), neural processing unit, AI (Artificial Intelligence) processor, field programmable gate array (FPGA), or application-specific integrated circuit (ASIC).

The GPU 112 (or graphics processor 112), hardware accelerator 114, and/or CPU 115 (or application processor 115) of example computing system 100 may include a systolic array 140. Although the systolic array 140 is depicted as part of the GPU 112, in some implementations, the CPU 115 and/or hardware accelerator 114 may also include the systolic array 140.

In one implementation, the example systolic array 140 may receive input values (e.g., via an input interface (not shown)) and process those inputs (using control logic circuitry 142, selection circuitry 144, and/or DPUs 146) to produce output data (e.g., via an output interface (not shown)). The input data may be received from one or more data sources (e.g., via one or more sensors, via a network interface, etc.). However, the input data may be received in any fashion such as, for example, from an external device (e.g., via a wired and/or wireless communication channel). In some examples, multiple different types of inputs may be received. In some examples, the input data and/or output data is received via inputs and/or outputs of the system of which the computing system 100 is a component.

In one implementation, systolic array 140 receives sparsity metadata, unpacked source data, and packed source data. The packed source data is pre-processed by an external agent (e.g., CPU 115, an intelligent sensor (not shown)). The pre-processing refers to the processing of original source data to remove sparse data (e.g., 0 values) from the original source data in order to generate the packed source data (e.g., non-zero value of the original data packed in different positions). The pre-processing by the external agent also generates the metadata corresponding to the packed source data, where the metadata indicates positions of the packed values in the original source data. The control logic circuitry 142 may enable the handling of packed source data, sparsity metadata, and unpacked source data in accordance with implementations of the disclosure.

The systolic array 140 utilizes the selection circuitry to identify, based on the sparsity metadata, correct elements of the unpacked source data that should be chosen to be multiplied with the incoming elements of packed source data. The selection circuitry 144 (e.g., muxes) can utilize the sparsity metadata to identify the position of the elements of the packed source data. Selection circuitry 144 may be implemented at each stage of the systolic array 140 to select which elements of the unpacked source data are passed to the corresponding DPUs 146 (e.g., multiply-accumulate circuitry) for multiplication with corresponding elements of the packed source data. A destination register can receive an output data of the operations of the systolic array 140.

The example systolic array 140, including control logic circuitry 142, selection circuitry 144, and DPUs 146, are implemented by one or more logic circuits such as, for example, hardware processors. In some examples, one or more of the systolic array 140, the control logic circuitry 142, the selection circuitry 144, and/or the DPUs 146 may be implemented by a same hardware component (e.g., a same logic circuit) or by different hardware components (e.g., different logic circuits, different computing systems, etc.). However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some implementations, the systolic array 140 may also be referred to as dot product circuitry.

In examples disclosed herein, the example systolic array 140 may utilize the structured sparsity as described herein to execute a machine learning model. The example machine learning model may be implemented using a neural network (e.g., a feedforward neural network). However, any other past, present, and/or future machine learning topology(ies) and/or architecture(s) may additionally or alternatively be used such as, for example, a CNN.

The data loads used in computations of Machine Learning algorithms exhibit a high number of zeros as input elements. In neural network applications, this is naturally caused by the topology of the implemented network and the characteristics of the modeled neurons. As an example, in a fully interconnected neural network, the outputs of a column or layer of neurons are connected to an input of each neuron in the next layer. A network is composed of many layers, each one possibly featuring many neurons. The last stage in the computation of the output of a neuron is executing the activation function. This function usually outputs the evaluation of a positive function when the computations of the neuron's inputs is positive, and outputs zero when they are negative (i.e. RELU activation functions). Due to that, many of the output results of a neuron can be zeroes, and in a following step in the computation of the neural network, fed to the next network layer.

In a workload with structured data, an agent (i.e. the CPU, the EU in the GPU or an external one) arranges one of the matrices (desirably, the one with higher sparsity) in such way that it is stripped out of its sparse data. Alongside the new data (or packed data), it produces a metadata that indicates the positions the original elements had. This metadata is used to correctly identify the source elements and perform the matrices multiplication. The data and the metadata can be stored in memory, such as systolic array memory 135, in different memory spaces or memory surfaces. Implementations of the disclosure define the rules that the data and the metadata have, rules that should be followed to ensure the correct compatibility between a workload data layout (software), and the hardware implementation of the instructions that processes its structured data.

The example I/O source 160 of the illustrated example of FIG. 1 enables communication of the input and output data stored in the systolic array memory 135 with other computing systems. In some implementations, the I/O source(s) 160 may include, at but is not limited to, a network device, a microprocessor, a camera, a robotic eye, a speaker, a sensor, a display screen, a media player, a mouse, a touch-sensitive device, and so on. In this manner, a central computing system (e.g., a server computer system) can perform training of the model and distribute the model to edge devices for utilization (e.g., for performing inference operations using the model). In examples disclosed herein, the I/O source 160 is implemented using an Ethernet network communicator. However, any other past, present, and/or future type(s) of communication technologies may additionally or alternatively be used to communicate a model to a separate computing system.

While an example manner of implementing the computer system 100 is illustrated in FIG. 1, one or more of the elements, processes and/or devices illustrated in FIG. 1 may be combined, divided, re-arranged, omitted, eliminated and/or implemented in any other way. Further, the example systolic array 140, the example control logic circuitry 142, selection circuitry 144, the example DPUs 146, the I/O source(s) 160, and/or, more generally, the example computing system 100 of FIG. 1 may be implemented by hardware, software, firmware and/or any combination of hardware, software and/or firmware. Thus, for example, any of the example systolic array 140, the example selection circuitry 142, the example DPUs 144, the example I/O source(s) 160, and/or, more generally, the example computing system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some implementations of the disclosure, a software and/or firmware implementation of at least one of the example systolic array 140, the example control logic circuitry 142, selection circuitry 144, the example DPUs 146, the example I/O source(s) 160, and/or, more generally, the example computing system 100 of FIG. 1 be provided. Such implementations can include a non-transitory computer readable storage device or storage disk such as a memory, a digital versatile disk (DVD), a compact disk (CD), a Blu-ray disk, etc. including the software and/or firmware. Further still, the example computing system 100 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not utilize direct physical (e.g., wired) communication and/or constant communication, but rather additionally includes selective communication at periodic intervals, scheduled intervals, aperiodic intervals, and/or one-time events.

Figure 2A:
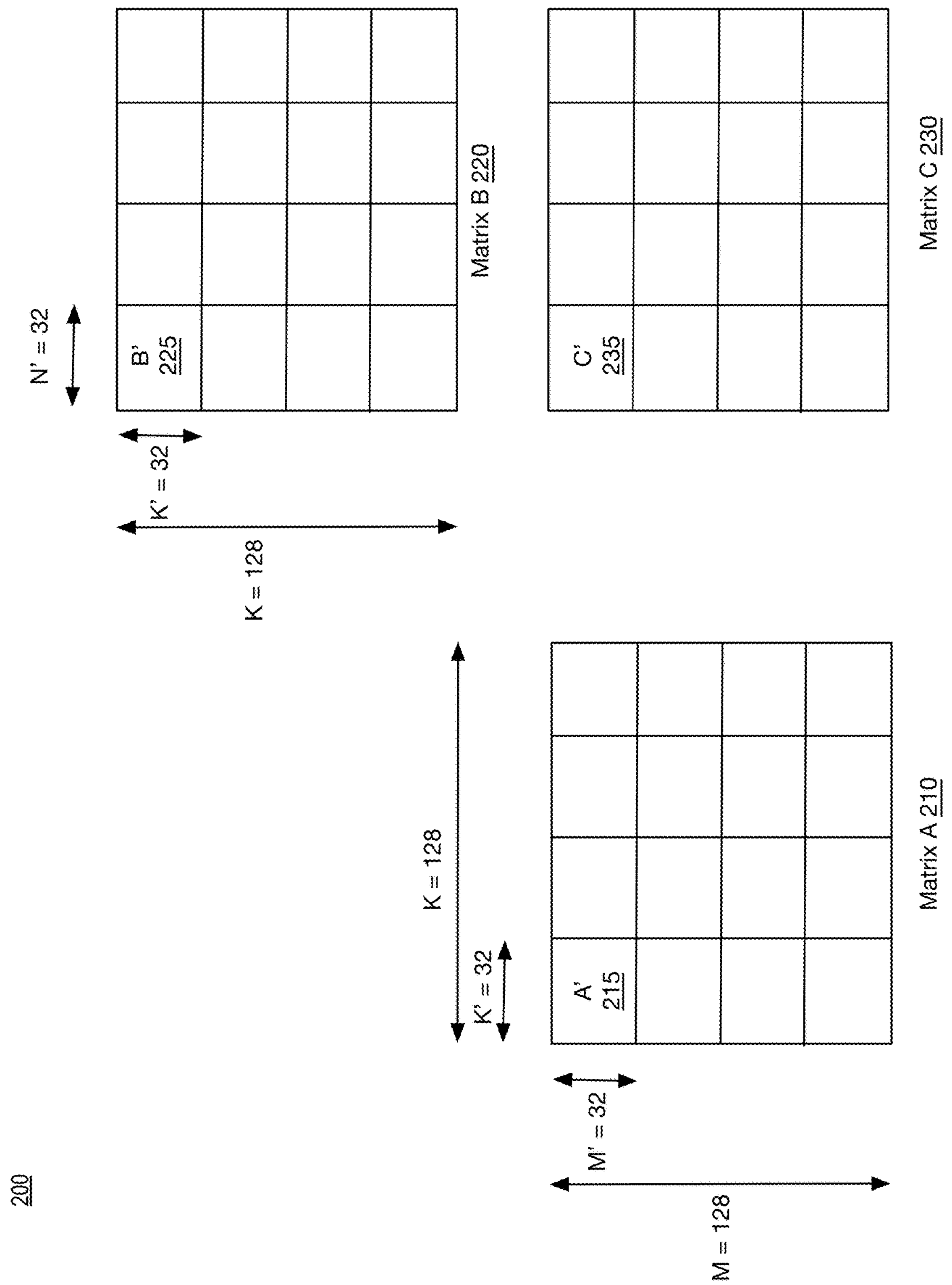
FIGS. 2A and 2B illustrate example depictions of matrix multiplication, in accordance with implementations of the disclosure.
Figure 2B:
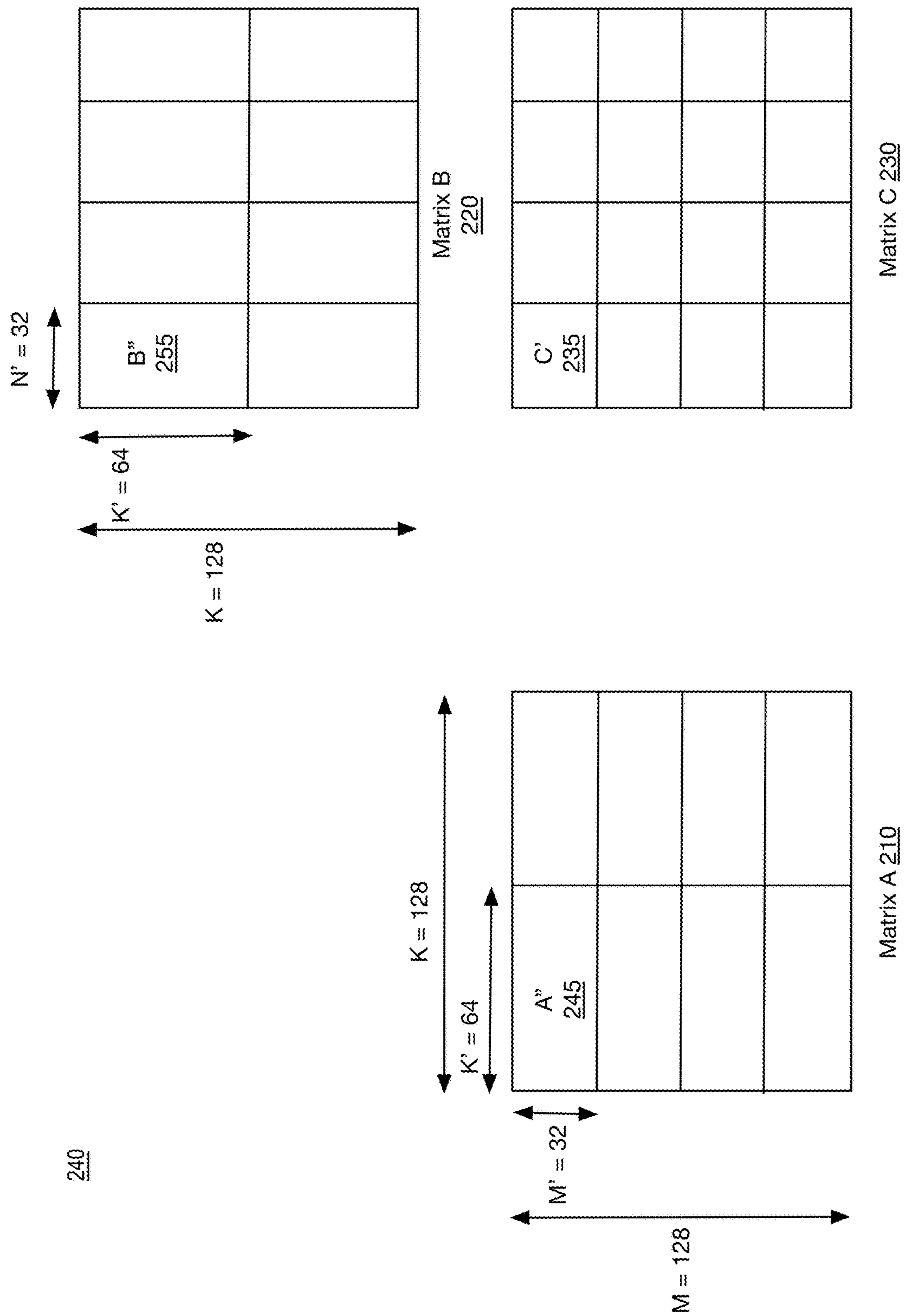

FIGS. 2A and 2B illustrate example depictions of matrix multiplication in accordance with implementations of the disclosure. In the examples of FIGS. 2A and 2B, illustrative matrices of 128×128 with half float elements are depicted. However, implementations of the disclosure may apply to a variety of matrix sizes and/or element datatypes.

FIG. 2A depicts a conventional implementation 200 of matrix multiplication that does not utilize the sparsity on the input data. In the conventional implementation 200, Matrix A 210, Matrix B 220, and Matrix C 230 are depicted. In one implementation, Matrix A 210 is considered as "source 1" or "src1", which is the broadcast matrix. Matrix B 220 is considered as "source 2" or "src2", which is the index matrix. Matrix C 230 is considered as the destination matrix holding the results of the multiplication between the elements of matrix A 210 and matrix b 220.

As shown in FIG. 2A, the matrices 210, 22, 230 are divided into 16 small matrices of 32×32 elements. For this example, the elements on the submatrix A' 215 may be considered as those that are used as the broadcasting register in the DPAS operation and the elements on the submatrix b' 225 may be considered as those that are used as the index register in the DPAS operation. Also, the computation of the elements of the resulting matrix C' 235 may be done collaboratively by a number of threads each one utilizing all the data of the matrix A' 215 and all the submatrices in its same row, and each one utilizing a sub-matrix on the same column as sub-matrix B' 225. This process is shown in FIG. 2A.

Implementations of the disclosure provide techniques to take advantage of the sparsity in the data of matrix A 210. FIG. 2B depicts a structured sparsity implementation 240 of matrix multiplication that utilizes the sparsity on the input data. In this example, the elements of a sub-matrix of A 210 may already be pre-processed by an external agent. As such, such elements of matrix A 210 may be considered as already packed and their corresponding metadata available. In this example, the external agent did not pre-process A' 215, but instead pre-processed a 32×64 (M'=32, K'=64) matrix referred to as A" 245. In implementations of the disclosure, the metadata for all the elements of a row of A" 245 is 64 bits in the example of FIG. 2B. Furthermore, the metadata for the whole A" sub-matrix 210 is 2048 bits (64×32). Sub-matrix A" 245 can then be multiplied against a similar size sub-matrix B" 255 of Matrix B 220, resulting in improved efficiency and power savings of the matrix multiplication operation.

Note that if no packing is done by the external agent, no gains due to the sparse data could be extracted. In this case, to operate 64 elements, two instructions for systolic dot product with accumulate (e.g., DPAS) instructions are utilized. However, if a sparsity of 50% or more is found in the data, it can be packed in 32 or less elements. As such, one sparse systolic dot product with accumulate instruction (e.g., sparse DPAS or SDPAS) is utilized. It should be noted that implementations of the disclosure may take advantage of data with less sparsity using more hardware.

Figure 3:
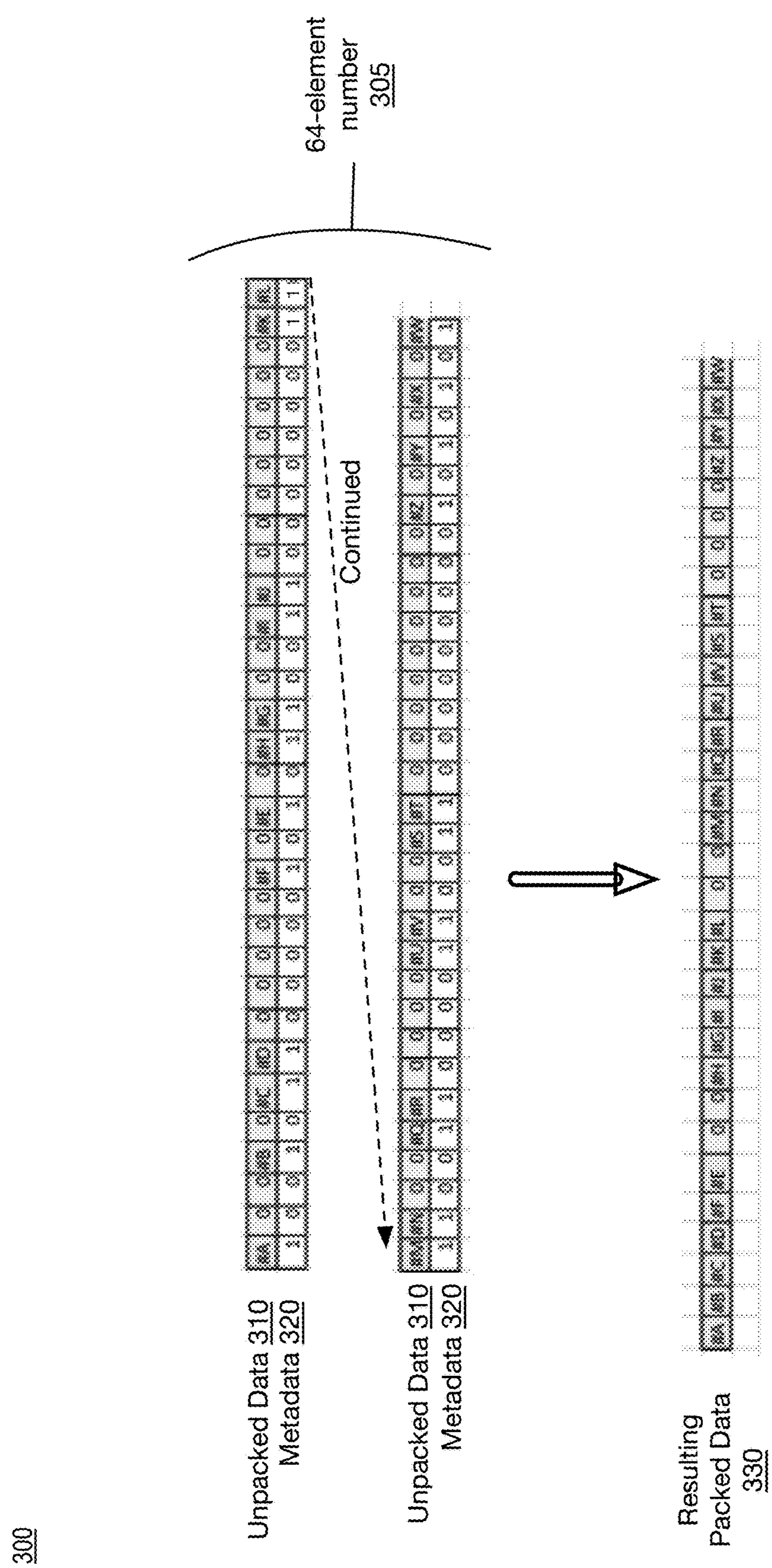
FIG. 3 illustrates a packing process for a row of a sub-matrix, in accordance with implementations of the disclosure.

FIG. 3 illustrates a packing process 300 for a row of the A" sub-matrix 245, in accordance with implementations of the disclosure. The packing process 300 depicts a 64-element 305 unpacked data 310 with 75% of sparsity. Corresponding metadata 320 for the unpacked data 310 is also shown. Those elements marked with a "#' symbol in the metadata 320 represent numbers different than 0. All others are 0, as labeled. Packing process 300 also shows the packed data 330 resulting from pre-processing the unpacked data 310 by removing sparse values. Further details of the packing process and its corresponding rules are described further below with respect to FIGS. 4-9.

To perform the matrices multiplication taking advantage of the sparsity of implementations of the disclosure, it is assumed that pre-processing has already been performed on the data (as it happens in structured workloads), and that it can be read in the same format as if it would have been pre-processed as described above. The latter case is useful in inference cases or in structured-data cases, where the CPU does the pre-processing of the weights in a neural network, and these weights do not change in the execution of the matrix.

One example of conventional matrix multiplication (no sparsity considered) performed by the systolic engine is discussed below to provide context. In the example of the conventional matrix multiplication, two input matrices, A and B, whose elements (e.g., in half-float datatype) can be input to a DPAS operation via a source 1 register (Src1) and source 2 register (Src2), respectively. In this example conventional case, elements on eight registers for src1 (matrix A) are multiplied to the elements in half register in the first column of matrix B (src2). The latter is named the broadcasting source or broadcasting register. This is because in the first stage of the systolic engine each group of elements of each channel in the first register of src1 (register R0) is multiplied (dot accumulate multiplication) by the group of elements on the first channel of src2. The fact that the elements on the first channel of src2 multiply all of the elements on each single channel in src1 give src2 the name of the broadcasting register. In some cases, the source 1 (src1) register may be referred to as the index (or indexing) source or the index (or indexing) register.

Continuing with the example convention case, in the second stage of the systolic array, the elements on each channel of the next src1 register are multiplied with the elements in the second channel of src2. The systolic array accumulates the multiplications performed on each stage, thus at the end of the pipeline's length, sixteen (one per channel) elements are generated which correspond to the first half column of matrix C in an output register. Note that half src2 register is used to generate the results saved in the output register. This is because the depth of the systolic array is eight stages. The other half of src2 is used to generate the second half column of matrix C, output register.

In comparison, implementations of the disclosure provide a systolic array that can take advantage of the sparsity on the data in the source registers. For example, implementations of the disclosure can take advantage of sparsity of data in src2 of the example above. As a result, the K dimension of the matrices can be doubled. Therefore, 64 half float elements in src2, divided in 16 groups (or one per channel) can be operated with the elements in 16 src1 registers. In implementations of the disclosure, this operation is described by an instruction and logic for sparse systolic dot product with accumulate of 16 depth. Further details of the instruction and logic for sparse systolic dot product with accumulate are provided further below. For ease of discussion, the instruction for sparse systolic dot product with accumulate discussed herein are referred to as a SDPAS instruction.

One illustrative example case of matrix multiplication where the sparsity of the broadcasting elements is 50% or more and is successfully packed by an agent (e.g., an external agent) is examined below. In this case, the instruction for sparse systolic dot product with accumulate arrives to the systolic array (e.g., sparsity control logic of the systolic array, such as control logic circuitry 142 described with respect to FIG. 1) that understands that, even though the depth encoding in the instruction is sixteen, it is dealing with structured data and, as such, a single pass in the systolic array of 8 depth is sufficient. No second pass is created. In the next cycle, a new instruction for sparse systolic dot product with accumulate can be accepted. The systolic array (e.g., systolic control logic, such as control logic circuitry 142 described with respect to FIG. 1) passes the metadata bits and the lower portion of src2 to selection circuitry and DPUs (e.g., the combination of selection circuitry and DPUs may be referred to as a systolic engine) of the systolic array.

As src2 is packed in the above example, the multiplication of its elements cannot be not done 1:1 with the src1 registers stored in the systolic engine's cache. Therefore, using the metadata, the correct element of src1 should be found for each src2 element.

With respect to the conventional matrix multiplication approach (e.g., not sparsity), if there is a 32 elements src2 (split in two 16 element groups), the groups would be multiplied with 16 src1 registers. Therefore, the first group of 2 elements of src2 (src2.0) can be broadcast to the elements in all the channels of Src1 in the first stage of the pipeline where the dot accumulate operation is done. In the next cycle, the second group of 2 elements of src2 (src2.1) can be broadcast to the elements in all the channels of the next src1 element (src1+1) and this happens in the second stage of the systolic engine. This sequence is repeated until all 16 groups of src2 (or 32 elements in src2) are multiplied with 16 elements of src1.

In comparison, in implementations of the disclosure, the sparse case of src2 has 16 elements packed in 8 groups. However, some of src2's elements can be multiplied with some of src1 registers not in the sequence mentioned before.

FIG. 4 illustrates an example data packing case 400 using half float (HF) elements, in accordance with implementations of the disclosure. As it was mentioned previously, zeroes in the source data were removed to pack the data. As shown in the example in FIG. 4, packing 402 of HF elements is depicted. After removing the sparse elements from original data (e.g., src2 data) 410 and packing into packed data 430, 6 groups of two half-float elements, and two groups with 0's remain in the packed data 430. Corresponding metadata 420 is also shown for the original data 410, where zeros in the original data 410 are removed in order to pack the data as packed data 430.

In the systolic array, multiplicands can be found 404 by using the position 440 of the set metadata bits 420. Using the original position, data can be extracted and the correct Src1 multiplicands can be found. For example, the first and second "1" in the metadata 420 are found in positions 3 and 4. Therefore, #A and #B are multiplied with src1+1. The third and fourth "1" in metadata 420 are found in positions 7 and 8. Therefore, #C and #D are multiplied with src1+3. This continues until the 11th and 12th "1" in the metadata are found in positions 29 and 30. Therefore, the #K and #L are multiplied with src1+14.

In the example shown in FIG. 4, these elements can be multiplied by stages 1 and 2, 4 through 6 and 8 in the systolic array, while stages 3 and 7 are multiplying 0's. In the case of multiplying 0's, the systolic array may have provisions to save power when the multiplications are done with zeroes. The first stage of the systolic array can multiply the two first elements (#A and #B) against src1+1, the second stage of the systolic array can multiply #C and #D against src1+3, and so on.

In implementations of the disclosure, passing the metadata to the systolic array is accomplished using a source register of the instruction for sparse systolic dot product with accumulate (also referred to as the metadata register), whose use is redefined and different than in an instruction for dot product accumulate systolic instruction. In one example, a fourth source register (e.g., src4) is utilized in the instruction to pass the metadata to the systolic array. Each element in the source register having sparse data (e.g., in the example above, src2 register) has a corresponding bit in the metadata register (e.g., src4). Therefore, in a macro of 16×8 instructions for sparse systolic dot product with accumulate of HF datatype, the sparse source data register elements in the first 8×1 instruction map to the first 32 bits of the metadata register. The sparse source data register elements of the next 8×1 instruction map to the second 32 elements of the metadata register, and so on.

In implementations of the disclosure, one example of the instruction for sparse systolic dot product with accumulate can be as follows:

sdpas dst:datatype, src0:datatype, src1:datatype, src2: datatype, metadata:datatype Upon receiving the first instruction for sparse systolic dot product with accumulate instruction, control logic (e.g., control logic circuitry 142 described with respect to FIG. 1) of the systolic array should understand that since src2 is of type HF, it should read its 32 metadata bits stored in the metadata register.

The following description details the rules an external agent should follow to generate structured data and metadata, and the process the systolic array follows to perform dot product multiplication using such data. In implementations of the disclosure, the first step in the process of taking advantage of the sparsity information starts with the data generated by an agent (e.g., external agent) who provides structured data and its associated metadata.

Figures 5A, 5B:
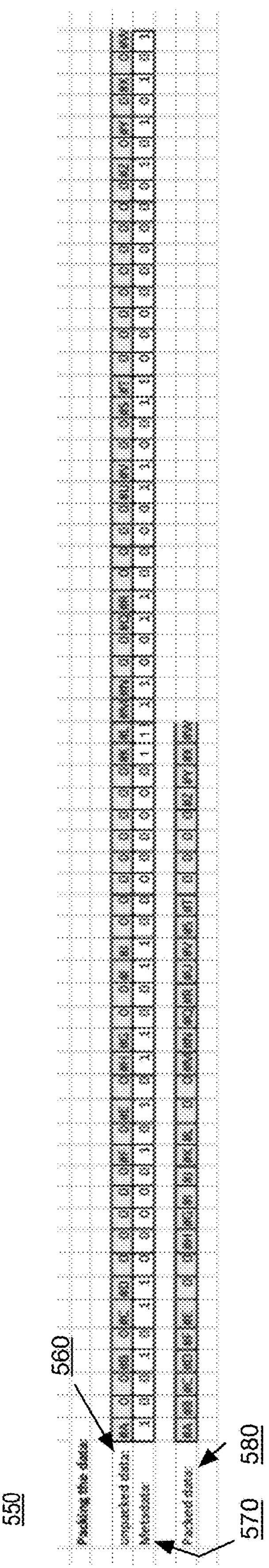
FIGS. 5A and 5B depict examples of unpacked data converted into corresponding packed data and metadata, in accordance with implementations of the disclosure.

FIGS. 5A and 5B depict examples of unpacked data converted into corresponding packed data and metadata, in accordance with implementations of the disclosure. As discussed above, data can arrive to a systolic array in a register with a packed datatype. In one example, for half-float (HF) datatypes, two 16-bit elements are packed in a channel as shown in FIG. 5A. In another example, for Int8, four 8-bit elements are packed in a channel as shown in FIG. 5B.

The process used to generate the metadata for each example results in a bit for each element (i.e., 32 bits for the example of HF elements of FIG. 5A, and 64 bits in the case of Int8 elements of FIG. 5B) indicating if the element was a zero (i.e., a bit 0 as the output) or not zero (i.e., a bit 1 as the output).

Other datatypes may also be utilized in the instructions for systolic dot product with accumulate (e.g., DPAS and/or SDPAS) of implementations of the disclosure. The other datatypes may include, but are not limited to, bfloat (BF), Int4, and Int2, to name a few examples. In the instruction for sparse systolic dot product with accumulate, BF datatypes are handled in the same way as HF datatypes. This is because both carry 16-bit elements. Int4 packs 8 elements of 4-bits per channel, and Int2 packs 16 elements of 8-bits per channel. To save hardware when the sparse systolic dot product with accumulate operation is computed, the metadata for Int4 elements can be compared in byte granularity and it can utilize 64 bits as metadata similar to the Int8 operation. However, other implementations of the disclosure can utilize 128 bits for Int4 datatype and 256 bits for Int2 datatype.

The process of packing the data begins with splitting the metadata into eight groups of four elements or sixteen groups of eight elements for the cases of HF/BF and Int8 datatypes, respectively. These are groups made of consecutive metadata values. Therefore, the first groups can be formed by the metadata bits on positions 1 to 4, the next group for bit 5 to 8, and so on in the case of HF or BF elements.

Within a group, the number of metadata bits representing a value different than 0 (bits set to 1) are counted. In some implementations, if the number of bits set to one is greater than, for example, half of the metadata bits in the group, for any of the groups, the packing process may not be implemented and the data is left unpacked (e.g., the techniques described herein are not applied and the dot product multiplication can be done using conventional systolic dot product with accumulate instructions). However, other thresholds for number of bits sets may be implemented and implementations of the disclosure are not limited to the 50% threshold for packing described above.

If the number of bits set to one is equal to or less than, for example, half of the metadata bits in the group, for each group, the data may be packed following this rule: The elements of the group are read from left to right. The first non-zero element takes the first position in the packed output. Consecutively, the next non-zero element is stored in the next position, and so on. This rule makes a 4:2 packing for half-float or bfloat numbers, and an 8:4 packing for int8 numbers.

As discussed above, FIG. 5A shows a first example 500 of packing original data 510 with elements of datatype half-float. In the original data 510, for the first two groups the elements on the upper half of the group survived. All of the elements in the third group were zero and thus zeroes were moved. Finally, in the fifth, the sixth, and eighth groups, the elements of the lower half of the group were stored. If any of the groups of 4 elements had less than 50% sparsity (e.g., less than half the elements were zero value), then such elements could not be merged in the packed data and packing could not be done. The metadata 520 depicts 0 for zero values, and 1 for non-zero values. The resulting packed data 530 depicts the resulting data when the original data 510 is packed.

As also discussed above, FIG. 5B shows a second example 550 of packing original data 560 when the element's datatype is Int8. Note that this time the grouping is 8:4 (eight elements to four elements), and that the same rules aforementioned apply. Metadata 570 corresponds to the original unpacked data 560 and the resulting packed data 580 is shown. BF8 and HF8 follow the same Int8 rules. For machines using the TF32 format, its grouping can be 2:1 (two elements to one element) and the same rules aforementioned for packing apply.

Figure 6:
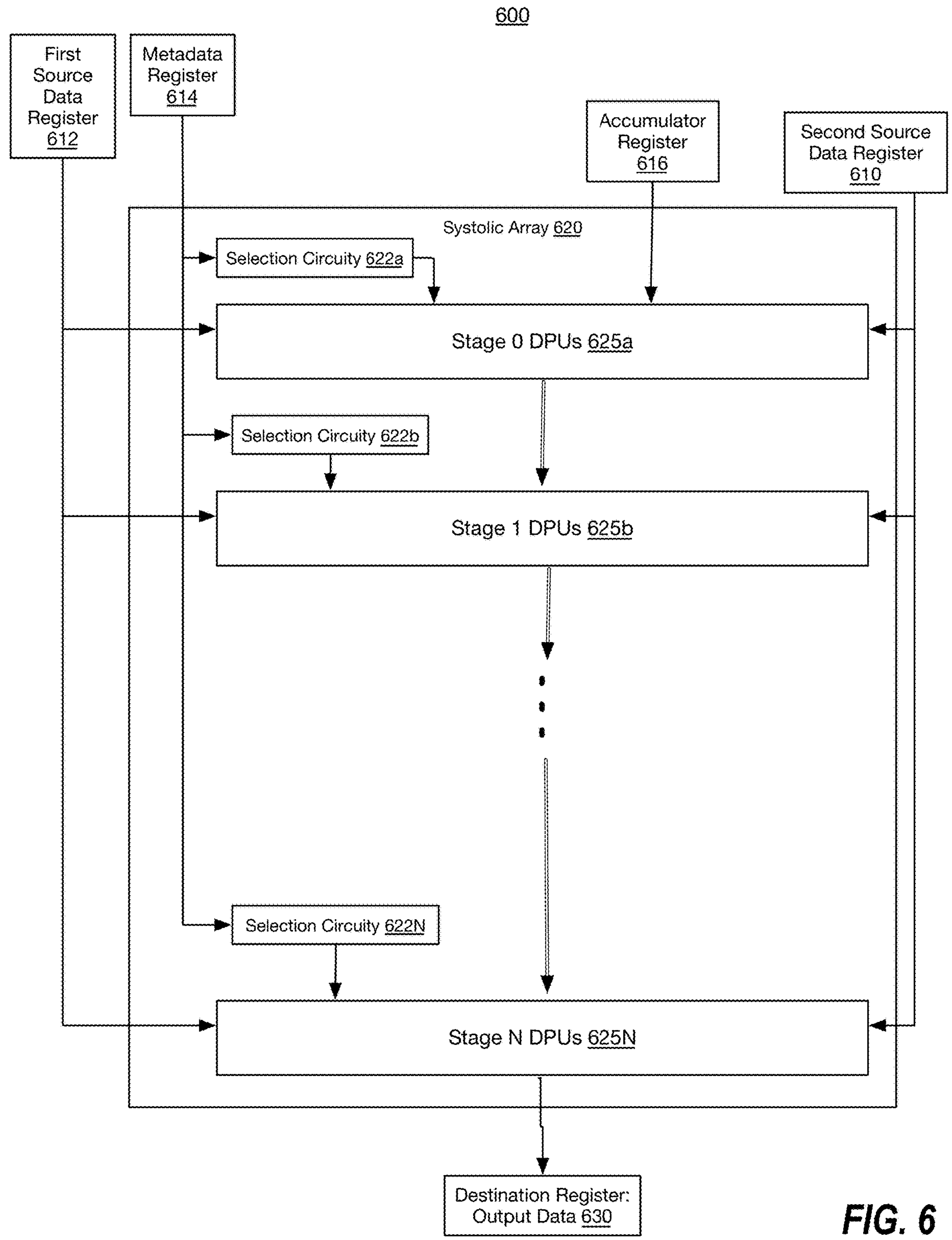
FIG. 6 illustrates an example computing environment implementing a systolic array that utilizes structured sparsity, in accordance with implementations of the disclosure.

FIG. 6 illustrates an example computing environment 600 implementing a systolic array 620 that utilizes structured sparsity in accordance with implementations of the disclosure. As mentioned in above, when the elements of a first source data register have been packed to take advantage of the sparsity of the data, the position can be decoded, and can be multiplied with a corresponding elements of second source data register different to those used when the matrix is not structured. This utilizes a systolic array structure to power-efficiently drive these elements to the stages of the systolic array.

Computing environment 600 depicts one example of such a systolic array structure implemented to utilize the structured sparsity of input data. Systolic array 620 may be a homogenous network of tightly-coupled DPUs called cells or nodes, where each node independently computes a partial result as a function of the data received from its upstream neighbors, stores the results within itself, and passes it downstream. In one example, the systolic array 620 can be used for massive multiply-accumulate operations. In some implementations, a systolic array 620 includes a W wide and D deep network of DPUs 625*a*-625N that can be used to perform vector or other data-parallel operations in a systolic manner. In one implementations, the DPUs 625*a*-625N can include one or more sets of interconnected multipliers and adders, each set of multipliers and adders to generate a dot product. The systolic array 620 can be configured to perform matrix operations, such as matrix dot product operations. In one embodiment, the systolic array 620 can be configured to accelerate machine learning processes.

In one implementation, systolic array 620 may receive as input data from multiple source registers 610, 612, 614. Systolic array 620 may also receive as input an accumulator register 616. In some implementations, the accumulator register may be a source 0 register (src0) in an instruction for sparse systolic dot product with accumulate. In one implementation, systolic array 620 receives metadata 614 from a metadata register, source data 612 from a first source data register, and source data 610 from second source data register. In one implementation, the first source data register 612 includes non-sparse (unpacked) source data while the second source data register 610 includes sparse (packed) source data. In another embodiment, the first source data register 612 includes sparse (packed) source data while the second source data register includes non-sparse (unpacked) source data.

As discussed above, the pre-processing of the packed source data (found in either 610 or 612, depending on the particular implementation) (e.g., broadcasting data) results in the original source data packed in different positions. For ease of explanation, the following discussion assumes that source data in the second source data register 610 is implemented as sparse (packed) source data and source data in the first source data register 612 is implemented as non-sparse (unpacked) source data. However, implementations of the disclosure also include the opposite arrangement with source data in the second source data register 610 being non-sparse (unpacked) source data and source data in the first source data register 612 being sparse (packed) source data.

When computing data using the implementations of the disclosure, the correct elements of the unpacked source data in first source data register 612 should be chosen to be multiplied with the incoming elements of packed source data of the second source data register 610. The systolic array 620 can utilize the metadata from the metadata register 614 to identify the position of the elements of the packed source data in the second source data register 610.

Selection circuitry 622*a*-622N (e.g., muxes) is implemented at each stage (also referred to as a systolic layer) of the systolic array 620 to select which elements of the unpacked source data of the first source data register 612 are utilized by the corresponding DPUs 625*a*-625N (e.g., multiply-accumulate circuitry) for multiplication (e.g., dot product multiplication) with corresponding elements of the packed source data of the second source data register 610. A destination register 630 receives a final output of the operations of the systolic array 620.

In implementations of the disclosure, the systolic array 620 may execute a decoded instruction for sparse systolic dot product with accumulate (e.g., an SDPAS instruction) to generate the output data at destination register 630. The instruction for sparse systolic dot product with accumulate is similar to the instruction for systolic dot product with accumulate used in conventional solutions, with enhancements to take the metadata as an input and use it to perform the correct matrix multiplication.

In one example, the syntax of the instruction for sparse systolic dot product with accumulate can be defined as:

sdpas.<sdepth>x<rcount> (exec_size) reg reg reg reg reg

Where the sdepth indicates the depth of the systolic array (number of it stages) the instruction runs on, rcount indicates the number of sdepthx1 instructions generated from this instruction, and the exec_size is the SIMDness of the instruction. In some implementations, the first reg refers to a destination register, the second reg refers to a src0 register, the third reg refers to a src1 register, the fourth reg refers to a src2 register, and the fifth (and final) reg refers to a metadata register.

The following example shows an example with three instructions for sparse systolic dot product with accumulate of repetition eight in accordance with an implementations of the disclosure:

sdpas.16×8 (16) reg:f reg:bf r20.0<0; 1,0>:bf reg:bf reg sdpas.16×8 (16) reg:f reg:bf r20.0<0; 1,0>:bf reg:bf reg sdpas.16×8 (16) reg:f reg:bf r20.0<0; 1,0>:bf reg:bf reg In one implementations, the last register is being used to hold the metadata for all of the instructions. A sub-register field may be used to indicate to the instruction the initial position of the metadata assigned to that instruction. This example uses elements as datatype bf. In the case of an instruction for sparse systolic dot product with accumulate using elements of int8 datatype, a full metadata register is utilized for each instruction for sparse systolic dot product with accumulate, for example.

Implementations of the disclosure provide for utilization of structured sparsity in a systolic array in the case of workloads exhibiting structured data in the broadcasting source (e.g., source 2), as well as, in some cases, the index source (e.g., source 1). In the case of structured sparsity in the index source (e.g., source 1), data in the src1 elements may be stripped from its sparse elements. The computation of the dot-product multiplication is performed following input information contained in a metadata to correctly interpret the positions of the elements that participate in the dot product operation. FIG. 7 below details such an implementation.

FIG. 7 illustrates a schematic 700 of operations of the systolic array when structured sparsity is provided in the index data (e.g., src1), in accordance with implementations of the disclosure. In one implementation, operations of the systolic array to execute instruction 750 are depicted in schematic 700 as using 16-bit datatype elements in the Src1 742 and Src2 744 operands. On the bottom of FIG. 7, an example of the instruction for sparse systolic dot product with accumulate (e.g., sdpas) operations 710 executed in the systolic array are shown. The sparse systolic dot product with accumulate operations occurring at different clock cycles 710 (e.g., claims cycles 1-9) in the example stages 720*a*-720*h* (collectively referred to as clock cycles 720) of the systolic array are also depicted.

Note that the instruction 750 for sparse systolic dot product with accumulate reads a full register for src2 744. Therefore for 8-bit datatype cases, it can read 64 elements, for 16-bit datatype cases it can read 32 elements, and for 4-bit datatype cases it can read 128 elements, and so on.

The instruction 750 for sparse systolic dot product with accumulate also reads the metadata 748 associated with the packing of the elements of the src1 742 registers. That metadata 748 should be used to determine which elements of src2 744 can participate in the dot product operation 746 on each channel and stage 720 of the systolic array.

The data in the registers pointed by src1 742 can arrive already packed with a 4:2 packing scheme for all the datatype cases, in one example. Therefore, for 16-bit datatypes, four bits of the metadata are utilized to represent the possible combinations of operations that can be done in a channel per stage of the systolic array. The first channel of the first stage in the systolic array can use the first bits (bits 0 to 3) of the metadata. In the example above, these bits may be "0011" with bit 0 being the rightmost one. The operation in that channel can be read in the first line of the following example output 1:

$$\mathrm{Out}[0] = ra[0] + rb[0].0 * rc.0 + rb[0].1 * rc.1$$

$$\mathrm{Out}[1] = ra[1] + rb[1].2 * rc.0 + rb[1].3 * rc.2$$

$$\ldots$$

$$\mathrm{Out}[15] = ra[15] + rb[15].30 * rc.1 + rb[15].31 * rc.3$$

If the metadata bits are read from right to left, the first "1" found indicates that the first element of src2 are to be multiplied with the first element of src1. If we keep reading the metadata bits, the second "1" is found in the second position, meaning that the second element of src2 is to be multiplied with the second element of src1. The third and fourth elements do not participate in the dot product operation.

A similar algorithm is used in the second channel of the first stage of the systolic array. The metadata bits to be used are those in positions 4 to 7. In one example, the metadata can be "0101", where bit 4 is the rightmost one. As shown in the second row (Out[1]) of example output 1 above, that indicates that the two elements in channel 1 can be multiplied with the elements 0 and 2 of src2. The last row (Out[15]) of example output 1 above shows where the metadata bits command that the elements of the last channel of Src1 are to be multiplied with the elements 1 and 3 of src2.

Example output 2 below shows more examples for the first, second and last channels of the second stage in the execution of the first spawned instruction for sparse systolic dot product with accumulate operation shown in the example.

$$\mathrm{Out}[0] = \mathrm{Prev}[0] + \mathrm{rd}[0].0 * rc.6 + \mathrm{rd}[0].1 * rc.7$$

$$\mathrm{Out}[1] = \mathrm{Prev}[1] + d[1].2 * rc.4 + \mathrm{rd}[1].3 * rc.5$$

$$\ldots$$

$$\mathrm{Out}[15] = \mathrm{Prev}[15] + \mathrm{rd}[15].30 * rc.5 + \mathrm{rd}[15].31 * rc.7$$

With respect to example output 2, note that because the outputs represent this second stage, the outputs use bits 64 to 127 of the metadata. Also note that the src2 elements that can participate in the operation are those in the third and fourth channels.

In some implementations, the instruction for sparse systolic dot product with accumulate may be implemented via a program code compilation process. In one implementation, a source code level description of a software program is compiled at a compiler, which can include multiple level of compilations, to a level having an operation that includes or specifies a dot product to be performed by processing logic. The operation can be an operation specified in an intermediate language or can be program code that references a primitive of a compute framework, such as a primitive provided by a machine learning framework. The operation that include or specifies a dot product may then be further compiled by an additional compiler, which can be a shader compiler, into machine level object code that includes a dot product instruction to be performed by an accelerator for matrix operations, as described herein. In one example, the dot product instruction may be performed by a matrix operation accelerator of a GPGPU.

FIG. 8 is a flow diagram illustrating an embodiment of a method 800 for utilizing structured sparsity in systolic arrays, in accordance with implementations of the disclosure. Method 800 may be performed by processing logic that may comprise hardware (e.g., circuitry, dedicated logic, programmable logic, etc.), software (such as instructions run on a processing device), or a combination thereof. More particularly, the method 800 may be implemented in one or more modules as a set of logic instructions stored in a machine- or computer-readable storage medium such as RAM, ROM, PROM, firmware, flash memory, etc., in configurable logic such as, for example, programmable logic arrays (PLAs), field-programmable gate arrays (FPGAs), complex programmable logic devices (CPLDs), in fixed-functionality logic hardware using circuit technology such as, for example, application-specific integrated circuit (ASIC), complementary metal oxide semiconductor (CMOS) or transistor-transistor logic (TTL) technology, or any combination thereof.

The process of method 800 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-7 may not be repeated or discussed hereafter. In one implementation, systolic array 140 described with respect to FIG. 1, may perform method 800.

Method 800 begins at processing block 810 where a processing device may receive, at a systolic array, data from a plurality of source registers, the data comprising unpacked source data, structured source data packed based on sparsity, and metadata corresponding to the structured source data. At block 820, the processing device may identify portions of the unpacked source data based on the metadata.

At block 830, the processing device may perform operations of the systolic array using the packed source data and the identified portions of the unpacked source data. At block 840, the processing device may output a result of the operation of the systolic device to a destination register.

FIG. 9 is a flow diagram illustrating another embodiment of a method 900 for performing matrix multiplication in systolic arrays utilizing structured sparsity, in accordance with implementations of the disclosure. Method 900 may be performed by processing logic that may comprise hardware (e.g., circuitry, dedicated logic, programmable logic, etc.), software (such as instructions run on a processing device), or a combination thereof. More particularly, the method 900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 900 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-7 may not be repeated or discussed hereafter. In one implementation, systolic array 140 described with respect to FIG. 1 may perform method 900.

Method 900 begins at processing block 910 where a processing device may, in response to execution of instruction for sparse systolic dot product with accumulate, read at least a portions of elements of a plurality of source registers referenced by the instruction. In one implementation, the plurality of source registers can include a first source register having metadata corresponding to structured source data, a second source register having unpacked source data, and a third source register having the structured source data packed based on sparsity.

At block 920, the processing device may provide a first subset of elements of the packed source data to at least one stage of a systolic array. In one implementation, the at least one stage of the systolic array includes dot product circuitry. At block 930, the processing device may select, using the metadata, a second subset of elements of the unpacked source data to utilize at the at least one stage of the systolic array. In one implementation, the second subset of elements corresponds to the first subset of elements.

Lastly, at block 940, the processing device may perform, at the at least one stage of the systolic array, dot produce accumulate operations using the first subset of elements and the second subset of elements.

Figure 10:
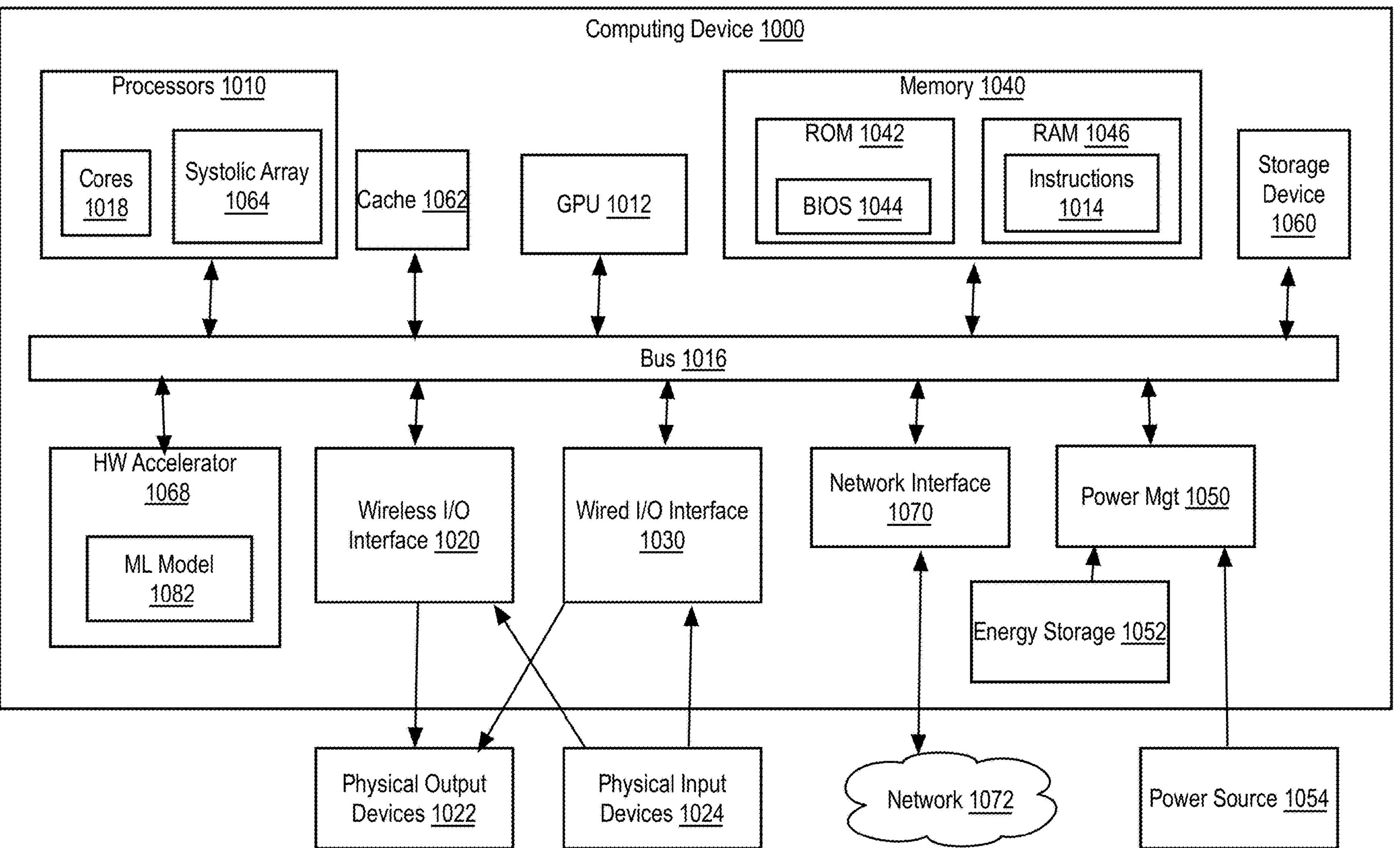
FIG. 10 is a schematic diagram of an illustrative electronic computing device to enable utilization of structured sparsity in systolic arrays, according to some embodiments.

FIG. 10 is a schematic diagram of an illustrative electronic computing device to enable utilization of structured sparsity in systolic arrays, according to some embodiments. In some embodiments, the computing device 1000 includes one or more processors 1010 including one or more processors cores 1018 and a systolic array 1064, the systolic array 1064 to utilize structured sparsity, as provided in FIGS. 1-9. In some embodiments, the computing device 1000 includes a hardware accelerator 1068, the hardware accelerator including a machine learning model 1084. In some embodiments, the computing device is to utilize structured sparsity in systolic arrays, as provided in FIGS. 1-9.

The computing device 1000 may additionally include one or more of the following: cache 1062, a graphical processing unit (GPU) 1012 (which may be the hardware accelerator in some implementations), a wireless input/output (I/O) interface 1020, a wired I/O interface 1030, system memory 1040 (e.g., memory circuitry), power management circuitry 1050, non-transitory storage device 1060, and a network interface 1070 for connection to a network 1072. The following discussion provides a brief, general description of the components forming the illustrative computing device 1000. Example, non-limiting computing devices 1000 may include a desktop computing device, blade server device, workstation, or similar device or system.

In embodiments, the processor cores 1018 are capable of executing machine-readable instruction sets 1014, reading data and/or instruction sets 1014 from one or more storage devices 1060 and writing data to the one or more storage devices 1060. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 1014 may include instructions to implement utilization of structured sparsity in systolic arrays, as provided in FIGS. 1-9.

The processor cores 1018 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1000 includes a bus or similar communications link 1016 that communicably couples and facilitates the exchange of information and/or data between various system components including the processor cores 1018, the cache 1062, the graphics processor circuitry 1012, one or more wireless I/O interfaces 1020, one or more wired I/O interfaces 1030, one or more storage devices 1060, and/or one or more network interfaces 1070. The computing device 1000 may be referred to in the singular herein, but this is not intended to limit the embodiments to a single computing device 1000, since in some embodiments, there may be more than one computing device 1000 that incorporates, includes, or contains any number of communicably coupled, collocated, or remote networked circuits or devices.

The processor cores 1018 may include any number, type, or combination of currently available or future developed devices capable of executing machine-readable instruction sets.

The processor cores 1018 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks are not be described in further detail herein, as they will be understood by those skilled in the relevant art. The bus 1016 that interconnects at least some of the components of the computing device 1000 may employ any currently available or future developed serial or parallel bus structures or architectures.

The system memory 1040 may include read-only memory ("ROM") 1042 and random access memory ("RAM") 1046. A portion of the ROM 1042 may be used to store or otherwise retain a basic input/output system ("BIOS") 1044. The BIOS 1044 provides basic functionality to the computing device 1000, for example by causing the processor cores 1018 to load and/or execute one or more machine-readable instruction sets 1014. In embodiments, at least some of the one or more machine-readable instruction sets 1014 cause at least a portion of the processor cores 1018 to provide, create, produce, transition, and/or function as a dedicated, specific, and particular machine, for example a word processing machine, a digital image acquisition machine, a media playing machine, a gaming system, a communications device, a smartphone, or similar.

The computing device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The computing device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include, but are not limited to: universal serial bus (USB), IEEE 1394 ("FireWire"), and similar.

The computing device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the computing device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor cores 1018 and/or graphics processor circuitry 1012 and/or one or more applications executed on or by the processor cores 1018 and/or graphics processor circuitry 1012. In some instances, one or more data storage devices 1060 may be communicably coupled to the processor cores 1018, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or Wi-Fi®, etc.).

Processor-readable instruction sets 1014 and other programs, applications, logic sets, and/or modules may be stored in whole or in part in the system memory 1040. Such instruction sets 1014 may be transferred, in whole or in part, from the one or more data storage devices 1060. The instruction sets 1014 may be loaded, stored, or otherwise retained in system memory 1040, in whole or in part, during execution by the processor cores 1018 and/or graphics processor circuitry 1012.

The computing device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the computing device 1000. The power source 1054 may include, but is not limited to, a solar power system, a commercial electric grid, a portable generator, an external energy storage device, or any combination thereof.

For convenience, the processor cores 1018, the graphics processor circuitry 1012, the wireless I/O interface 1020, the wired I/O interface 1030, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 1018 and/or the graphics processor circuitry 1012. In some embodiments, all or a portion of the bus 1016 may be omitted and the components are coupled directly to each other using suitable wired or wireless connections.

Flowcharts representative of example hardware logic, machine readable instructions, hardware implemented state machines, and/or any combination thereof for implementing the components of implementations of the disclosure discussed herein. The machine readable instructions may be one or more executable programs or portion(s) of an executable program for execution by a computer processor, such as the processor 1010 shown in the example computing device 1000 discussed above in connection with FIG. 10. The program may be embodied in software stored on a non-transitory computer readable storage medium such as a CD-ROM, a floppy disk, a hard drive, a DVD, a Blu-ray disk, or a memory associated with the processor 1010, but the entire program and/or parts thereof could alternatively be executed by a device other than the processor 1010 and/or embodied in firmware or dedicated hardware. Further, although the example program is described with reference to the flowcharts illustrated in FIGS. 5 and/or 6, many other methods of implementing the example computing system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate utilizing structured sparsity in systolic arrays. The apparatus of Example 1 comprises a processor comprising a systolic array to: receive data from a plurality of source registers, the data comprising unpacked source data, structured source data that is packed based on sparsity, and metadata corresponding to the structured source data; identify portions of the unpacked source data to multiply with the structured source data, the portions of the unpacked source data identified based on the metadata; and output, to a destination register, a result of multiplication of the portions of the unpacked source data and the structured source data.

In Example 2, the subject matter of Example 1 can optionally include wherein the systolic array to perform dot product accumulate operations. In Example 3, the subject matter of any one of Examples 1-2 can optionally include wherein the systolic array further comprises a plurality of multiplexor circuits to select the portions of the unpacked source data to multiply with the structured source data based on the metadata. In Example 4, the subject matter of any one of Examples 1-3 can optionally include wherein the structured source data that is packed based on sparsity comprises elements of a broadcast register of the systolic array.

In Example 5, the subject matter of any one of Examples 1-4 can optionally include wherein the structured source data that is packed based on sparsity comprises elements of an index register of the systolic array. In Example 6, the subject matter of any one of Examples 1-5 can optionally include wherein the systolic array to execute an instruction for sparse systolic dot product with accumulate to identify the portions of the unpacked source data to multiply with the structured source data using the metadata and to perform a dot product multiplication of the portions with the structured source data multiplication, and wherein the metadata is provided in a source register of the plurality of source registers called by the instruction. In Example 7, the subject matter of any one of Examples 1-6 can optionally include wherein packed source data comprises at least one of a half-float datatype that packs two 16-bit elements into a channel, a bfloat datatype that packs two 16-bit elements into a channel, an int8 datatype that packs four 8-bit elements into a channel, an int4 datatype that packs eight 4-bit elements into a channel, or an int2 datatype that packs sixteen 2-bit elements into a channel.

In Example 8, the subject matter of any one of Examples 1-7 can optionally include wherein the metadata indicates a position of non-zero elements in an original form of the structured source data prior to packing into the structured source data. In Example 9, the subject matter of any one of Examples 1-8 can optionally include wherein the original form of the structured source data is pre-processed by an external agent to pack into the structured source data by removing sparse elements from the original form, and wherein the external agent generates the metadata.

In Example 10, the subject matter of any one of Examples 1-9 can optionally include wherein the external agent comprises at least one of a central processing unit (CPU) or an intelligent sensor. In Example 11, the subject matter of any one of Examples 1-10 can optionally include wherein the processor comprises a general-purpose graphics processing unit (GPGPU).

Example 12 is at least one non-transitory machine readable storage medium for facilitating utilizing structured sparsity in systolic arrays. The non-transitory computer-readable storage medium of Example 12 having stored thereon executable computer program instructions that, when executed by one or more processors, cause the one or more processors to perform operations comprising: receiving, by a systolic array of the at least one processor, data from a plurality of source registers, the data comprising unpacked source data, structured source data that is packed based on sparsity, and metadata corresponding to the structured source data; identifying portions of the unpacked source data to multiply with the structured source data, the portions of the unpacked source data identified based on the metadata; and outputting, to a destination register, a result of multiplication of the portions of the unpacked source data and the structured source data.

In Example 13, the subject matter of Example 12 can optionally include wherein the systolic array to perform dot product accumulate operations. In Example 14, the subject matter of Examples 12-13 can optionally include wherein the systolic array further comprises a plurality of multiplexor circuits to select the portions of the unpacked source data to multiply with the structured source data based on the metadata.

In Example 15, the subject matter of Examples 12-14 can optionally include wherein the systolic array to execute an instruction for sparse systolic dot product with accumulate to identify the portions of the unpacked source data to multiply with the structured source data using the metadata and to perform a dot product multiplication of the portions with the structured source data multiplication, and wherein the metadata is provided in a source register of the plurality of source registers called by the instruction. In Example 16, the subject matter of Examples 12-15 can optionally include wherein the metadata indicates a position of non-zero elements in an original form of the structured source data prior to packing into the structured source data.

Example 17 is a method for facilitating utilizing structured sparsity in systolic arrays. The method of Example 17 can include receiving, by a systolic array of a processing device, data from a plurality of source registers of the processing device, the data comprising unpacked source data, structured source data that is packed based on sparsity, and metadata corresponding to the structured source data; identifying portions of the unpacked source data to multiply with the structured source data, the portions of the unpacked source data identified based on the metadata; and outputting, to a destination register of the processing device a result of multiplication of the portions of the unpacked source data and the structured source data.

In Example 18, the subject matter of Example 17 can optionally include wherein the systolic array to perform dot product accumulate operations. In Example 19, the subject matter of any one of Examples 17-18 can optionally include wherein the systolic array further comprises a plurality of multiplexor circuits to select the portions of the unpacked source data to multiply with the structured source data based on the metadata. In Example 20, the subject matter of any one of Examples 17-19 can optionally include wherein the systolic array to execute an instruction for sparse systolic dot product with accumulate to identify the portions of the unpacked source data to multiply with the structured source data using the metadata and to perform a dot product multiplication of the portions with the structured source data multiplication, and wherein the metadata is provided in a source register of the plurality of source registers called by the instruction.

Example 21 is a system for facilitating utilizing structured sparsity in systolic arrays. The system of Example 21 can optionally include a memory, and a processor communicably coupled to the memory. The processor of the system of Example 21 can comprise a systolic array to: receive data from a plurality of source registers, the data comprising unpacked source data, structured source data that is packed based on sparsity, and metadata corresponding to the structured source data; identify portions of the unpacked source data to multiply with the structured source data, the portions of the unpacked source data identified based on the metadata; and output, to a destination register, a result of multiplication of the portions of the unpacked source data and the structured source data.

In Example 22, the subject matter of Example 21 can optionally include wherein the systolic array to perform dot product accumulate operations. In Example 23, the subject matter of any one of Examples 21-22 can optionally include wherein the systolic array further comprises a plurality of multiplexor circuits to select the portions of the unpacked source data to multiply with the structured source data based on the metadata. In Example 24, the subject matter of any one of Examples 21-23 can optionally include wherein the structured source data that is packed based on sparsity comprises elements of a broadcast register of the systolic array.

In Example 25, the subject matter of any one of Examples 21-24 can optionally include wherein the structured source data that is packed based on sparsity comprises elements of an index register of the systolic array. In Example 26, the subject matter of any one of Examples 21-25 can optionally include wherein the systolic array to execute an instruction for sparse systolic dot product with accumulate to identify the portions of the unpacked source data to multiply with the structured source data using the metadata and to perform a dot product multiplication of the portions with the structured source data multiplication, and wherein the metadata is provided in a source register of the plurality of source registers called by the instruction. In Example 27, the subject matter of any one of Examples 21-26 can optionally include wherein packed source data comprises at least one of a half-float datatype that packs two 16-bit elements into a channel, a bfloat datatype that packs two 16-bit elements into a channel, an int8 datatype that packs four 8-bit elements into a channel, an int4 datatype that packs eight 4-bit elements into a channel, or an int2 datatype that packs sixteen 2-bit elements into a channel.

In Example 28, the subject matter of any one of Examples 21-27 can optionally include wherein the metadata indicates a position of non-zero elements in an original form of the structured source data prior to packing into the structured source data. In Example 29, the subject matter of any one of Examples 21-28 can optionally include wherein the original form of the structured source data is pre-processed by an external agent to pack into the structured source data by removing sparse elements from the original form, and wherein the external agent generates the metadata.

In Example 30, the subject matter of any one of Examples 21-29 can optionally include wherein the external agent comprises at least one of a central processing unit (CPU) or an intelligent sensor. In Example 31, the subject matter of any one of Examples 21-30 can optionally include wherein the processor comprises a general-purpose graphics processing unit (GPGPU).

Example 32 is an apparatus for facilitating utilizing structured sparsity in systolic arrays according to implementations of the disclosure. The apparatus of Example 32 can comprise means for receiving, by a systolic array, data from a plurality of source registers of the processing device, the data comprising unpacked source data, structured source data that is packed based on sparsity, and metadata corresponding to the structured source data; means for identifying portions of the unpacked source data to multiply with the structured source data, the portions of the unpacked source data identified based on the metadata; and means for outputting, to a destination register, a result of multiplication of the portions of the unpacked source data and the structured source data.

In Example 33, the subject matter of Example 32 can optionally include the apparatus further configured to perform the method of any one of the Examples 18 to 20.

Example 34 is at least one machine readable medium comprising a plurality of instructions that in response to being executed on a computing device, cause the computing device to carry out a method according to any one of Examples 17-20. Example 35 is an apparatus for facilitating utilizing structured sparsity in systolic arrays, configured to perform the method of any one of Examples 17-20. Example 36 is an apparatus for facilitating utilizing structured sparsity in systolic arrays comprising means for performing the method of any one of claims 17 to 20. Specifics in the Examples may be used anywhere in one or more embodiments.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:

a processor comprising a systolic array to:

receive data from a plurality of source registers, the data comprising unpacked source data, structured source data that is packed based on sparsity, and metadata corresponding to the structured source data;

identify portions of the unpacked source data to multiply with the structured source data, the portions of the unpacked source data identified based on the metadata; and output, to a destination register, a result of multiplication of the portions of the unpacked source data and the structured source data.

2. The apparatus of claim 1, wherein the systolic array to perform dot product accumulate operations.

3. The apparatus of claim 1, wherein the systolic array further comprises a plurality of multiplexor circuits to select the portions of the unpacked source data to multiply with the structured source data based on the metadata.

4. The apparatus of claim 1, wherein the structured source data that is packed based on sparsity comprises elements of a broadcast register of the systolic array.

5. The apparatus of claim 1, wherein the structured source data that is packed based on sparsity comprises elements of an index register of the systolic array.

6. The apparatus of claim 1, wherein the systolic array to execute an instruction for sparse systolic dot product with accumulate to identify the portions of the unpacked source data to multiply with the structured source data using the metadata and to perform a dot product multiplication of the portions with the structured source data, and wherein the metadata is provided in a source register of the plurality of source registers called by the instruction.

7. The apparatus of claim 1, wherein packed source data comprises at least one of a half-float datatype that packs two 16-bit elements into a channel, a bfloat datatype that packs two 16-bit elements into a channel, an int8 datatype that packs four 8-bit elements into a channel, an int4 datatype that packs eight 4-bit elements into a channel, or an int2 datatype that packs sixteen 2-bit elements into a channel.

8. The apparatus of claim 1, wherein the metadata indicates a position of non-zero elements in an original form of the structured source data prior to packing into the structured source data.

9. The apparatus of claim 8, wherein the original form of the structured source data is pre-processed by an external agent to pack into the structured source data by removing sparse elements from the original form, and wherein the external agent generates the metadata.

10. The apparatus of claim 9, wherein the external agent comprises at least one of a central processing unit (CPU) or an intelligent sensor.

11. The apparatus of claim 1, wherein the processor comprises a general-purpose graphics processing unit (GPGPU).

12. At least one non-transitory machine readable storage medium comprising instructions that, when executed, cause at least one processor to at least:

receiving, by a systolic array of the at least one processor, data from a plurality of source registers, the data comprising unpacked source data, structured source data that is packed based on sparsity, and metadata corresponding to the structured source data;

identifying portions of the unpacked source data to multiply with the structured source data, the portions of the unpacked source data identified based on the metadata; and outputting, to a destination register, a result of multiplication of the portions of the unpacked source data and the structured source data.

13. The at least one non-transitory machine readable storage medium of claim 12, wherein the systolic array to perform dot product accumulate operations.

14. The at least one non-transitory machine readable storage medium of claim 12, wherein the systolic array further comprises a plurality of multiplexor circuits to select the portions of the unpacked source data to multiply with the structured source data based on the metadata.

15. The at least one non-transitory machine readable storage medium of claim 12, wherein the systolic array to execute an instruction for sparse systolic dot product with accumulate to identify the portions of the unpacked source data to multiply with the structured source data using the metadata and to perform a dot product multiplication of the portions with the structured source data, and wherein the metadata is provided in a source register of the plurality of source registers called by the instruction.

16. The at least one non-transitory machine readable storage medium of claim 12, wherein the metadata indicates a position of non-zero elements in an original form of the structured source data prior to packing into the structured source data.

17. A method comprising:

receiving, by a systolic array of a processing device, data from a plurality of source registers of the processing device, the data comprising unpacked source data, structured source data that is packed based on sparsity, and metadata corresponding to the structured source data;

identifying portions of the unpacked source data to multiply with the structured source data, the portions of the unpacked source data identified based on the metadata; and outputting, to a destination register of the processing device, a result of multiplication of the portions of the unpacked source data and the structured source data.

18. The method of claim 17, wherein the systolic array to perform dot product accumulate operations.

19. The method of claim 17, wherein the systolic array further comprises a plurality of multiplexor circuits to select the portions of the unpacked source data to multiply with the structured source data based on the metadata.

20. The method of claim 17, wherein the systolic array to execute an instruction for sparse systolic dot product with accumulate to identify the portions of the unpacked source data to multiply with the structured source data using the metadata and to perform a dot product multiplication of the portions with the structured source data, and wherein the metadata is provided in a source register of the plurality of source registers called by the instruction.

* * * * *